Oct. 22, 1935. R. R. HALSTEAD Re. 19,732

AIR FILTER

Original Filed Nov. 19, 1931 2 Sheets-Sheet 1

INVENTOR.
Richard R. Halstead
BY Thrudy and Pannon
HIS ATTORNEYS.

Oct. 22, 1935. R. R. HALSTEAD Re. 19,732

AIR FILTER

Original Filed Nov. 19, 1931 2 Sheets-Sheet 2

INVENTOR.
Richard R. Halstead
BY Thredy and Pannon
HIS ATTORNEYS.

Reissued Oct. 22, 1935 Re. 19,732

UNITED STATES PATENT OFFICE 19,732

AIR FILTER

Richard R. Halstead, Beach, N. Dak., assignor to Halstead Corporation, Beach, N. Dak., a corporation of North Dakota Original No. 1,948,791, dated February 27, 1934, Serial No. 576,164, November 19, 1931. Application for reissue May 23, 1935, Serial No. 23,054

2 Claims. (Cl. 183—63)

This invention appertains to new and useful improvements in the general art of gas separation, and more particularly to a novel air cleaner for use in conjunction with engines of the internal combustion type.

The principal object of this invention is to provide a filter through which air is drawn by the suction of an internal combustion engine, to which it is attached in a manner whereby all dust and other foreign matter is removed in an efficient manner.

Another important object of the invention is to provide an air cleaner involving a mobile cleaning unit which in operation not only cleans, by filtration, the air fed to the engine, but also eliminates the foreign matter collected therein.

A further object of the present invention is to provide a novel device for assuring that a supply of relatively clean oil or other air filtering liquid will at all times and automatically be supplied from the oil or liquid basin into the well from which the same will be carried into the air filtering or cleaning element by the action of the collectors or "scoops".

Other important objects and advantages of the invention will become apparent to the reader of the following specification.

In the drawings:—

Figure 1:
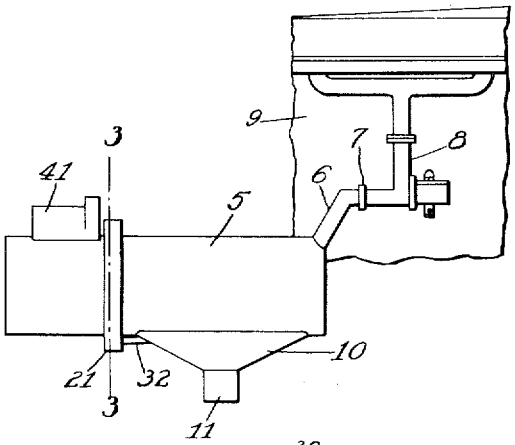
Figure 1 represents a fragmentary side elevational view of an engine showing the air cleaner attached thereto.

Referring to the drawings wherein like numerals designate like parts, it can be seen that the preferred form of the invention includes a cylindrical shell 5 having a neck 6 at one end for attachment as at 7 to the usual intake manifold pipe 8, which is associated with the engine 9 as shown in Fig. 1. The bottom portion of this shell 5 depends to form a basin 10 which merges at its lowermost point with the well 11 forming a settling receiver for sediment in the oil expelled by the rotor generally referred to by numeral 12.

Figure 3:
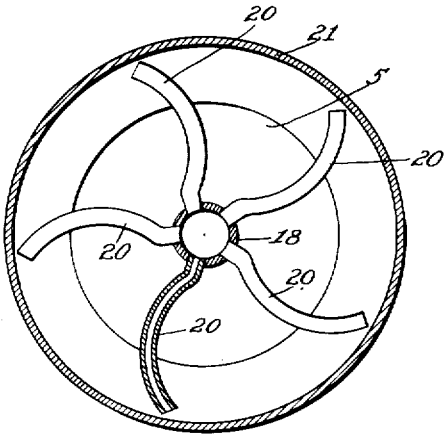
Fig. 3 represents a sectional view taken substantially on line 3—3 of Fig. 1.
Figure 7:
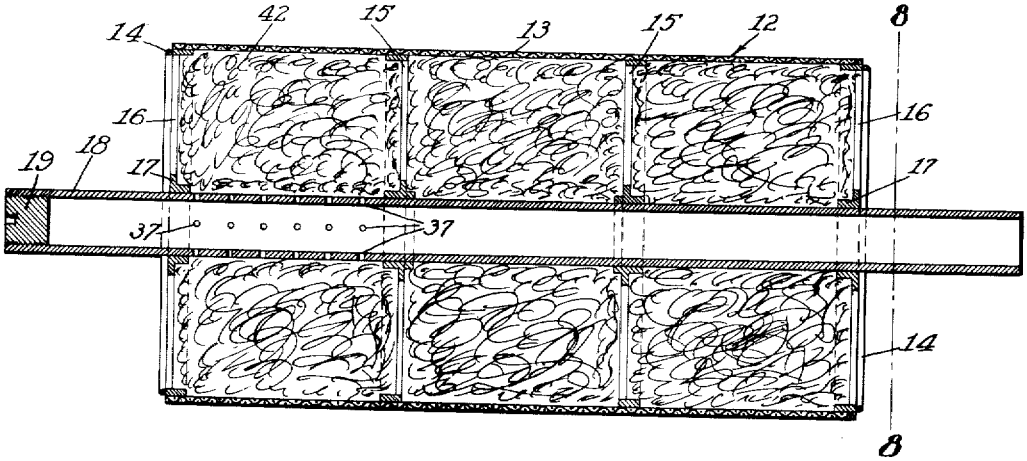
Fig. 7 represents a longitudinal sectional view through the rotor and shaft.

As is clearly shown in Fig. 7, this rotor consists of a cylinder 13 of mesh material having an annular rib or bead 14 secured to each end thereof. Wire spiders 15 sustain the shape of the cylinder 13 in the intermediate portion, while spiders 16 are provided at the ends of the rotor cylinder 13, each having a hub 17 for receiving the elongated hollow shaft 18 which extends thru the rotor and beyond each end thereof. The rear end of this shaft 18 is plugged as at 19, while extending curvedly from the shaft 18 adjacent the plugged end portion are the collectors 20, each being of tubular construction and open at its outer end, as in the manner substantially shown in Fig. 3.

The interior of each of these collectors 20 communicates with the interior of the shaft 18 and obviously as these collectors rotate in the rideway 21 or liquid well of the shell 5, they collect oil 22 from the bottom thereof.

Figure 5:
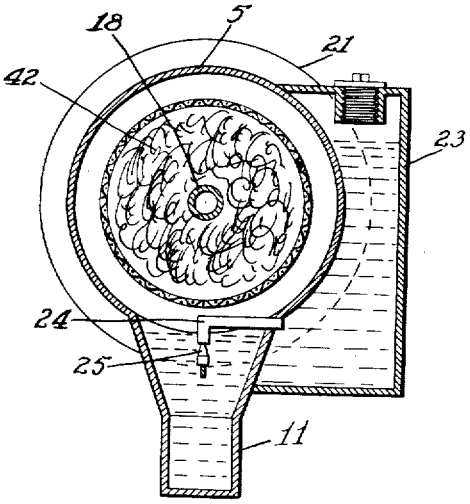
Fig. 5 represents a sectional view taken substantially on line 5—5 of Fig. 2.
Figure 8:
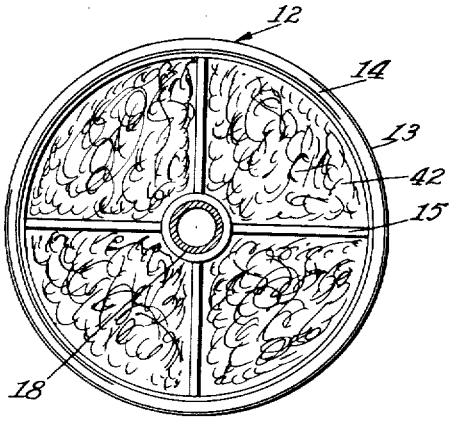
Fig. 8 represents a sectional view taken substantially on line 8—8 of Fig. 7.
Figure 6:
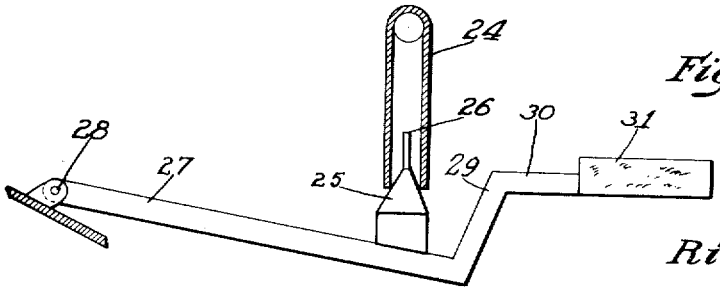
Fig. 6 represents a fragmentary detailed sectional view showing the float-controlled valve.

By referring to Fig. 5, it can be seen that a reservoir 23 is provided on one side of the shell 5 and a conduit 24 extends therefrom and into the interior of the basin 10. As is clearly shown in Fig. 6, numeral 25 represents a conical valve having a guide stem 26 which is operable within the open end of the conduit 24 whereby the supply of the reservoir 23 can be controlled. This valve 25 is located on the elongated arm 27 which is pivotally connected to the wall of the basin 10 as at 28. The outer end portion of the arm 27 is offset upwardly as at 29 and horizontally as at 30 to carry the float 31. This float and arm operate in the basin 10 to maintain a constant level of oil in this basin and to also control the level of oil in the rideway 21, oil being supplied from the basin 10 to the rideway 22 through the conduit 32.

Figure 4:
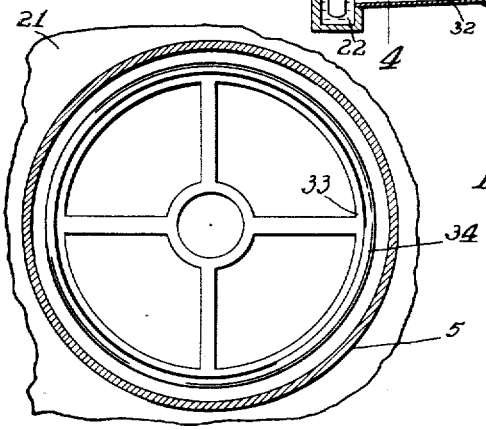
Fig. 4 represents a cross sectional view taken substantially on line 4—4 of Fig. 2.

Secured to the inside of the shell 5 at each end of the rotor 12 is a spider 33, each of which is provided on one side with an annular rib or bead 34 (see Fig. 4) for riding engagement against the corresponding rib or bead 14 on the rotor 12.

Thus it can be seen that an air space 35 is provided between the rotor 12 and the shell 5 into which foreign matter can be thrown from the rotor 12.

The forward end of the aforementioned shaft is opened, and engages into the bearing 36 and incidentally lubricates this bearing, due to the fact that some of the oil collected by the collectors 20 will pass the outlet openings 37 in the shaft 18 adjacent the rear end of the rotor 12 and will travel to this end of the shaft for lubricating this bearing.

The mesh cylinder 12 is to be filled preferably with copper wool as a filtering substance for the air. For effecting rotation of the rotor 12, the rear end of the shaft 18 is provided with a gear wheel 38 which meshes with the pinion 39 carried by the screw shaft 40 operating in the housing 41 located upon the shell 5.

It can now be seen, that the suction of the engine to which this air cleaner is attached will be exerted longitudinally on the screw shaft 40 which will result in the rotation of the screw and the consequent rotation of the shaft 18. The rotor 12 being secured to the shaft 18, rotates therewith and in the rotation of the shaft 18, the oil collectors 20 dip up oil which runs into the shaft 18 and out through the openings 37 into the copper wool 42.

Thus, the rear end of the copper wool mass becomes saturated with oil which obviously assists materially in cleaning air as it passes through this portion of the copper wool. As the air passes through the remaining portion of the copper wool, it is cleaned of whatever oil residue remains therein, before the air reaches the forward spider 33, at which point it leaves the rotor 12 to enter the intake manifold pipe 8 by way of the neck 6.

The rotation of the rotor 12 serves continuously to expel the used oil in the rear end of the rotor 12 and incidentally to eliminate whatever foreign matter has been collected by the oil. The oil returns to the basin 10 and any sediment therein, settles to the well 11 while this oil is used over again, and automatically, the level in the basin 10 is maintained by the aforementioned float controlled valve 25.

Figure 2:
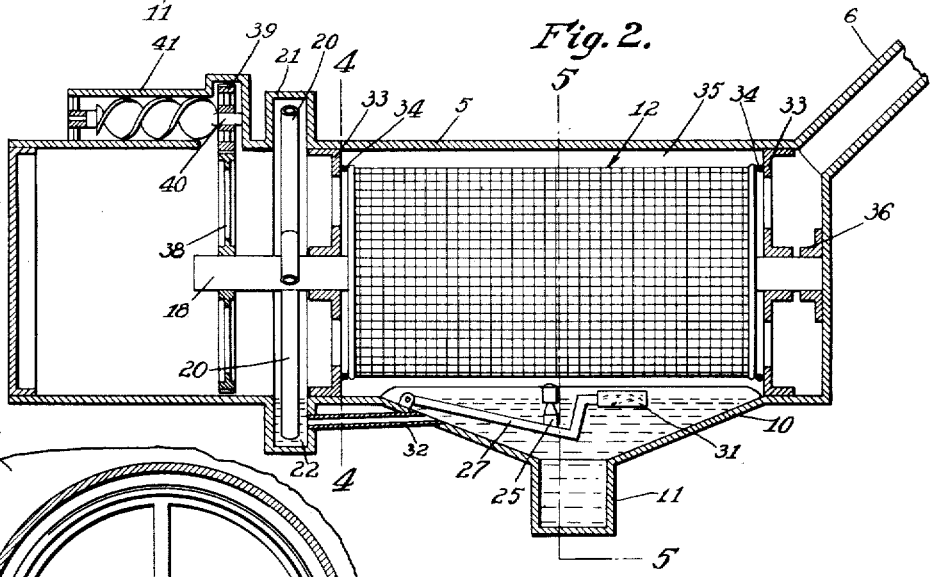
Fig. 2 represents a longitudinal sectional view through the air cleaner.

It will be noted that in the operation of the present air filtering device the relatively lighter and cleaner oil or other air filtering liquid collects at the top of the basin 10 and is fed, by gravity, through the conduit or tube 32, which is inclined slightly from the horizontal (Fig. 2), into the well 21, from which it is scooped up by the members 20 and carried into the air filtering or cleaning element 42, thus assuring that a supply of relatively clean oil or other air filtering liquid is at all times and automatically supplied to the filtering or cleaning element 42.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:

1. An air filtering device comprising a casing having an air inlet and an air outlet and including a sump basin; a liquid well arranged at the bottom of said casing; said sump basin and well being spaced from each other; an air filtering or cleaning element in the said casing between the said inlet and the said outlet; a member rotatably mounted in said casing and having a portion movable into and out of said well for conveying the air filtering or cleaning liquid from said well into said filtering or cleaning element; and a tube or conduit extending from the upper area of said sump basin into said well for conveying the relatively lighter and cleaner air filtering liquid from the upper area of said sump basin into said well.

2. An air filtering device comprising a casing having an air inlet and an air outlet and including a sump basin; a liquid well arranged at the bottom of said casing; said sump basin and well being spaced from each other; an air filtering or cleaning element in the said casing between the said inlet and the said outlet; a member rotatably mounted in said casing and having a portion movable into and out of said well for conveying the air filtering or cleaning liquid from said well into said filtering or cleaning element; and a tube or conduit extending between the upper part of said basin and said well for conveying the relatively lighter and cleaner air filtering liquid from the upper area of said basin into said well; said tube or conduit being inclined slightly from the horizontal so that the relatively cleaner air cleaning or filtering liquid will automatically flow by gravity from the upper area of said sump basin into said well.

RICHARD R. HALSTEAD.